United States Patent
Li

(10) Patent No.: US 10,916,019 B2
(45) Date of Patent: Feb. 9, 2021

(54) MOVING OBJECT DETECTION IN IMAGE FRAMES BASED ON OPTICAL FLOW MAPS

(71) Applicant: SONY CORPORATION, Tokyo (JP)

(72) Inventor: Pingshan Li, San Jose, CA (US)

(73) Assignee: SONY CORPORATION, Tokyo (JP)

(*) Notice: Subject to any disclaimer, the term of this patent is extended or adjusted under 35 U.S.C. 154(b) by 121 days.

(21) Appl. No.: 16/265,057

(22) Filed: Feb. 1, 2019

(65) Prior Publication Data
US 2020/0250836 A1 Aug. 6, 2020

(51) Int. Cl.
*G06K 9/00* (2006.01)
*G06T 7/246* (2017.01)
*G06T 3/00* (2006.01)
*G06T 7/73* (2017.01)
*G06T 7/194* (2017.01)
*G06T 7/155* (2017.01)
*G06T 5/30* (2006.01)

(52) U.S. Cl.
CPC ............ *G06T 7/248* (2017.01); *G06T 3/0093* (2013.01); *G06T 5/30* (2013.01); *G06T 7/155* (2017.01); *G06T 7/194* (2017.01); *G06T 7/74* (2017.01); *G06T 2207/10016* (2013.01); *G06T 2207/20036* (2013.01)

(58) Field of Classification Search
CPC ......... G06T 7/248; G06T 7/74; G06T 3/0093; G06T 7/194; G06T 5/30; G06T 7/155; G06T 2207/20036; G06T 2207/10016
See application file for complete search history.

(56) References Cited

U.S. PATENT DOCUMENTS

| | | | | |
|---|---|---|---|---|
| 6,303,920 B1* | 10/2001 | Wixson | ............ | G06K 9/00335 250/208.1 |
| 6,956,603 B2* | 10/2005 | Fujii | .............. | G06T 7/215 348/169 |
| 8,150,104 B2* | 4/2012 | Mizutani | ................ | G06T 7/248 382/103 |
| 8,189,051 B2* | 5/2012 | Shih | ................ | G06T 7/215 348/169 |

(Continued)

OTHER PUBLICATIONS

A. A. Shafie et al., "Motion Detection Techniques Using Optical Flow", World Academy of Science, Engineering and Technology International Journal of Electrical and Computer Engineering vol. 3, No. 8, 2009.*

(Continued)

*Primary Examiner* — Samir A Ahmed
(74) *Attorney, Agent, or Firm* — Chip Law Group

(57) ABSTRACT

An apparatus and method for detection of moving objects in a sequence of frames, includes circuitry, a memory, and an image-capture device. The circuitry derives a first optical flow map based on motion information of a first frame and a second frame of a plurality of frames. A second optical flow map is further derived, based on motion information of the second frame and a third frame of the plurality of frames. A first foreground region is further identified that corresponds to the moving objects across the first frame and the second frame and the identified first foreground region is warped across the first frame and the second frame and the moving objects are detected, based on combination of a plurality of pixels in the warped first foreground region and the second foreground region.

17 Claims, 4 Drawing Sheets

(56) References Cited

U.S. PATENT DOCUMENTS

| | | | |
|---|---|---|---|
| 8,964,034 B2 | 2/2015 | Nagamine et al. | |
| 9,224,049 B2 | 12/2015 | Feris et al. | |
| 2003/0025794 A1* | 2/2003 | Fujii | G06T 7/215 |
| | | | 348/169 |
| 2003/0213892 A1* | 11/2003 | Zhao | H01L 27/146 |
| | | | 250/208.1 |
| 2008/0278584 A1* | 11/2008 | Shih | G06T 7/215 |
| | | | 348/169 |
| 2010/0202661 A1* | 8/2010 | Mizutani | G06T 7/248 |
| | | | 382/103 |
| 2014/0168431 A1 | 6/2014 | Goto et al. | |
| 2015/0242700 A1* | 8/2015 | Zhang | G06K 9/481 |
| | | | 382/154 |
| 2016/0182769 A1* | 6/2016 | Choi | G06K 9/46 |
| | | | 348/169 |
| 2017/0186176 A1* | 6/2017 | Paluri | G06K 9/4628 |

OTHER PUBLICATIONS

Shizuka Fujisawa et al., "Pedestrian Counting in Video Sequences based on Optical Flow Clustering" International Journal of Image Processing (IJIP), vol. 7 : Issue (1) : 2013.*

Kiran Kale et al., "Moving Object Tracking using Optical Flow and Motion Vector Estimation", 2015 4th International Conference on Relaliability, Infocom Technologies and Optimization (ICIRTO) (Trends Future Directions), Noida India, Sep. 2-4, 2015, IEEE Xplore.*

Braillon, et al.,"Real-time Moving Obstacle Detection Using Optical Flow Models", Intelligent Vehicles Symposium 2006, Jun. 13-15, 2006, 7 pages.

* cited by examiner

MOVING OBJECT DETECTION IN IMAGE FRAMES BASED ON OPTICAL FLOW MAPS

REFERENCE

None.

FIELD

Various embodiments of the disclosure relate to object detection in computer vision. More specifically, various embodiments of the disclosure relate to an apparatus and method for moving object detection in image frames based on optical flow maps.

BACKGROUND

Recent advancements in the field of computer vision have led to development of various techniques for moving object detection in a sequence of image frames such as video content. Such techniques for moving object detection in the video content may be useful in various applications, for example, video-surveillance applications, activity recognition applications, auto-focus applications, or detecting object-of-interest in camera applications. One such image processing technique is image segmentation, which may refer to the partitioning of an image into several regions based on certain rules. Although various segmentation methods have been known to separate foreground region (object) from the background of an image or a video, the complexity, accuracy, and computational resource requirements vary based on one or more objectives to be achieved.

In certain scenarios, as a result of severe noise present in most image and depth sensors, the boundaries of the foreground object regions obtained that rely heavily on values obtained from such image and depth sensors, are often not smooth. There may be some undesired holes within the foreground object regions as a result of the invalid values from the image and depth sensor. In certain scenarios, foreground detection and segregation from background in a sequence of frames may be performed based on an optical flow procedure. In certain scenarios, while detecting moving objects corresponding to the foreground region, during an image/video capture, noise may be present in the optical flow procedure. In such scenarios, the optical flow procedure-based techniques may lead to erroneous detection of objects-of-interest during the movement of the objects.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for moving object detection in a sequence of frames based on optical flow is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
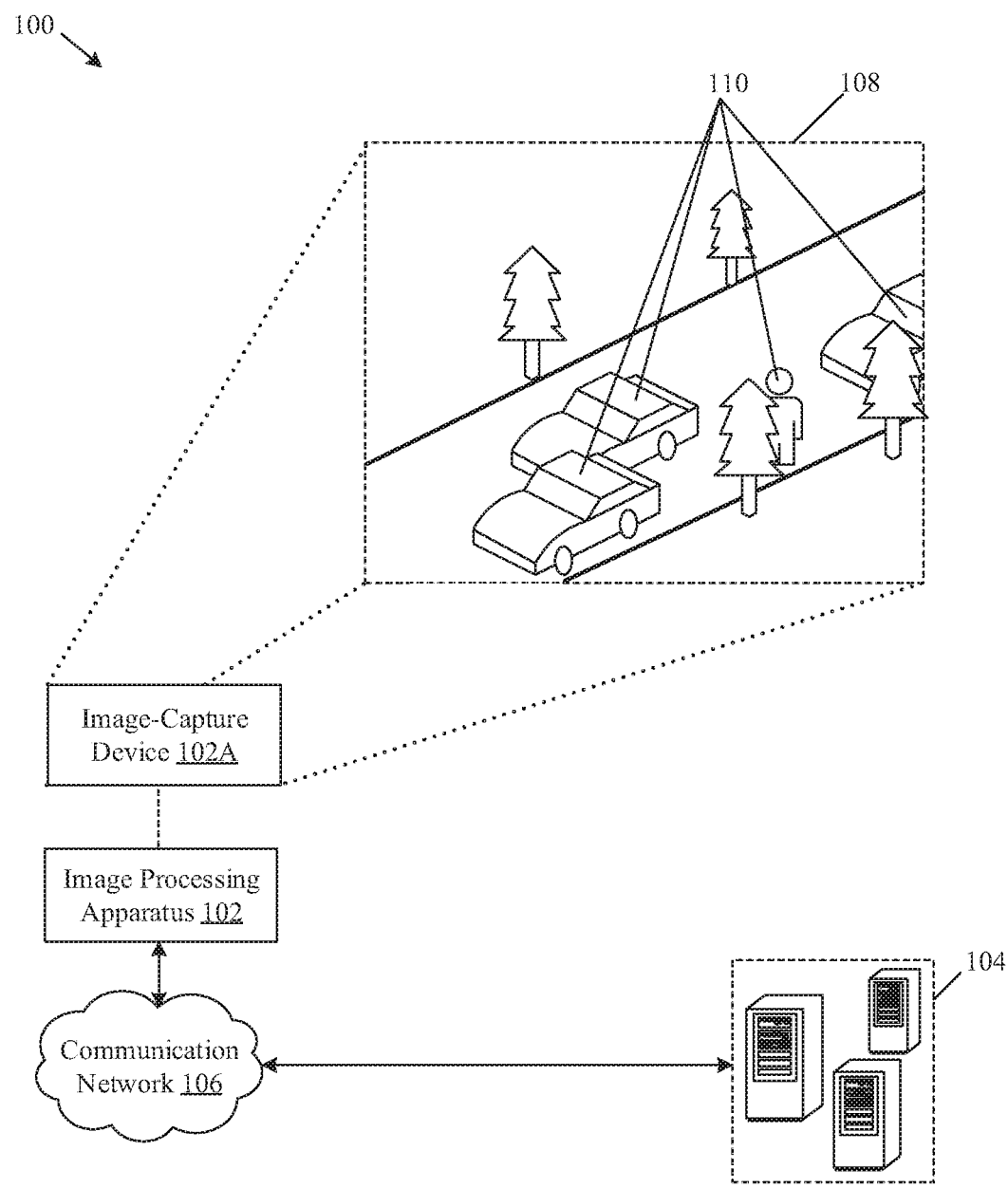
FIG. 1 is a block diagram that illustrates an exemplary network environment for detection of moving objects in a sequence of frames, in accordance with an embodiment of the disclosure.

The following described implementations may be found in the disclosed image processing apparatus and method for detection of moving objects in a sequence of frames. Exemplary aspects of the disclosure may include an image processing apparatus that may include circuitry configured to capture, by an image-capture device, a plurality of frames in a sequence. The plurality of frames may include at least a first frame, a second frame, and a third frame. The circuitry may be further configured to derive a first optical flow map based on motion information of a first frame and a second frame of a plurality of frames captured by the image-capture device. The derivation of the first optical flow map may be further based on a difference of a pixel position of the plurality of pixels in the second frame and the first frame. The first optical flow map may comprise a plurality of first motion vector values that corresponds to a motion of the plurality of pixels from the first frame to the second frame.

In accordance with an embodiment, the circuitry may be configured to derive a second optical flow map. The second optical flow map may also be derived, based on motion information of the second frame and a third frame of the plurality of frames. The second optical flow map may comprise a plurality of second motion vector values that may correspond to a motion of the plurality of pixels from the second frame to the third frame. The derivation of the second optical flow map may be further based on a difference of a pixel position of the plurality of pixels in the third frame and the second frame. The second optical flow map may comprise a plurality of second motion vector values that corresponds to a motion of the plurality of pixels from the second frame to the third frame.

In accordance with an embodiment, the circuitry may be further configured to detect a background region in each of the plurality of frames based on a plurality of optical flow maps for the plurality of frames. The background region may be detected based on gyro information and optical flow maps that may be derived based on displacement of pixels in different frames of the captured plurality of frames.

In accordance with an embodiment, the circuitry may be configured to identify a first foreground region based on the derived first optical flow map. The identified first foreground region may correspond to at least one moving object across the first frame and the second frame. The circuitry may be configured to warp the identified first foreground region associated with the moving object across the first frame and the second frame based on the derived first optical flow map. The warping may also be referred to as a warping process, which is used to verify the identified first foreground region. The warping of the identified first foreground region may be further based on mapping of each pixel of a plurality of pixels in the second frame to a corresponding pixel in the first frame.

In accordance with an embodiment, the circuitry may be further configured to identify a second foreground region that corresponds to the at least one moving object across the second frame and the third frame based on the derived second optical flow map. The circuitry may be configured to detect the moving object based on combination of a plurality of pixels in the warped first foreground region and a plurality of pixels in the second foreground region that corresponds to the moving object in the third frame. The detection of at least one moving object may be further based on an overlap of the second foreground region for the at least one moving object over the warped first foreground region for the corresponding moving object.

In accordance with an embodiment, the circuitry may be further configured to determine a final foreground region based on a combination of the plurality of pixels in the warped first foreground region and the corresponding plurality of pixels in the second foreground region. The circuitry may be configured to apply morphological operations to the final foreground region that corresponds to the detected at least one moving object in the plurality of frames. In accordance with an embodiment, the morphological operations comprise morphological dilation and morphological erosion. The circuitry may be further configured to label a foreground region corresponding to the detected at least one object in the plurality of frames.

FIG. 1 is a block diagram that illustrates an exemplary network environment for moving object detection in a sequence of frames, in accordance with an embodiment of the disclosure. With reference to FIG. 1, there is shown a network environment 100. The network environment 100 may include an image processing apparatus 102 communicatively coupled to an image-capture device 102A and a server 104, via a communication network 106. In some embodiments, the image processing apparatus 102 may be utilized to capture a plurality of frames of a scene (for example, a scene 108) in a field-of-view (FOV) of the image-capture device 102A. Such scene may include a plurality of objects (for example, the plurality of objects 110) that may be in motion in successive frames of the captured plurality of frames (in sequence) of the scene (for example, the scene 108).

The image processing apparatus 102 may comprise suitable circuitry, and interfaces that may be configured to segregate the foreground region and background region from the plurality of frames based on an optical flow map technique. The image processing apparatus 102 may be configured to dynamically segment a plurality of objects (for example, the plurality of objects 110) as a foreground region, which may be detected in the plurality of frames in real time or near-real time. Examples of the image processing apparatus 102 may include, but are not limited to, action cams, autofocus cams, digital cameras, camcorders, camera phones, dash cams, closed circuit television (CCTV) cams, (Internet Protocol) IP cams, reflex cams, traffic cams, projectors, web-cams, computer workstations, mainframe computers, handheld computers, cellular/mobile phones, smart appliances, video players, DVD writer/players, smart televisions, a head-mounted device (HMD), and an augmented reality based device.

The image-capture device 102A may comprise suitable circuitry, and interfaces that may be configured to capture a plurality of frames in a sequence from a scene in a field-of-view (FOV) of the image-capture device 102A. The image-capture device 102A may further include a viewfinder that may be configured to compose and focus on a scene that may include a plurality of objects (for example, the scene 108 that includes the plurality of objects 110). The image-capture device 102A may be configured to store the captured plurality of frames in a local buffer, a memory, and the server 104. Examples of the image-capture device 102Ak may include, but are not limited to, action cams, autofocus cams, digital cameras, camcorders, camera phones, dash cams, closed circuit television (CCTV) cams, (Internet Protocol) IP cams, reflex cams, traffic cams, projectors, web-cams, computer workstations, mainframe computers, handheld computers, cellular/mobile phones, smart appliances, video players, DVD writer/players, smart televisions, a head-mounted device (HMD), and an augmented reality based device.

The server 104 may comprise suitable logic, circuitry, and interfaces that may be configured to store data and communicate with the image processing apparatus 102. The server 104 may further include a set of databases to store a set of video feeds (of sets of frames) of different scenes. In one embodiment, the computational resources required to detect different moving objects in a scene may be shared between the image processing apparatus 102 and the server 104. In another embodiment, the computational resources of the server 104 may be only utilized to detect different moving objects in a scene (for example, the scene 108). Examples of the server 104 may include, but are not limited to, a web server, a database server, a file server, an application server, and a cloud server.

The communication network 106 may include a medium through which the image processing apparatus 102 may communicate with the server 104. Examples of the communication network 106 may include, but are not limited to, the Internet, a cloud network, a Long Term Evolution (LTE) network, a Wireless Local Area Network (WLAN), a Local Area Network (LAN), a telephone line (POTS), and a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols.

In operation, a plurality of frames may be obtained in sequence by the image processing apparatus 102. The plurality of frames may refer to a sequence of images that includes a scene (for example, the scene 108) having a plurality of objects (for example, the plurality of objects 110) in motion. In accordance with an embodiment, such plurality of frames may be captured by the image-capture device 102A, communicatively coupled to the image processing apparatus 102, in real time or near-real time. The image-capture device 102A may be configured to capture the plurality of frames of a scene (for example, the scene 108) within the FOV of the image-capture device 102A. In accordance with another embodiment, the plurality of frames may be obtained from a database of images or videos stored on the server 104, via the communication network 106. In accordance with an embodiment, the image processing apparatus 102 may be a camera with integrated image sensor, such as the image-capture device 102A.

Each frame in the plurality of frames may include a foreground region and a background region. The foreground region may include different objects that may be engaged in motion in the plurality of frames and the background region may include all the remnant portion in the plurality of frames apart from the foreground region. In some embodiments, the background region in each frame of the plurality of frames may be a static background region with the foreground region associated with change in position of specific set of pixel values in successive frames of the plurality of frames. In other embodiments, the background region in some of the frames of the plurality of frames may be a semi-static background region, where a portion of the background region may exhibit motion. The plurality of images may include the plurality of moving objects composed of at least a first portion engaged in motion in the scene (for example, the scene 108) and a second portion occluded by different objects in the foreground region of the plurality of images. In accordance with an embodiment, the image-capture device 102A may be static or in motion.

The detection of the plurality of objects that may be engaged in motion in the plurality of frames may further require at least three frames for a verified detection of the plurality of objects in the plurality of frames. Thus, the captured plurality of frames may include at least a first frame, a second frame, and a third frame in a sequential order, for example, each frame may be captured, for example, in a minute long segment of a "30 frames per second (FPS)" video feed.

The image processing apparatus 102 may be configured to derive a first optical flow map based on motion information in the first frame and the second frame of the captured plurality of frames. The first optical flow map may be generated based on a difference of pixel locations of the plurality of pixels in the second frame and the first frame. An optical flow map represents distribution of apparent velocities of objects in an image. The image processing apparatus 102 may be further configured to utilize the derived first optical flow map to compute a plurality of first motion vector values. The plurality of first motion vector values may correspond to a relative movement of each of the plurality of pixels from the first frame to the second frame.

The image processing apparatus 102 may be configured to derive a second optical flow map based on motion information of the second frame and the third frame of the plurality of frames captured by the image-capture device 102A. The second optical flow map may be generated based on a difference of pixel location of the plurality of pixels in the second frame and the third frame. The image processing apparatus 102 may be further configured to utilize the derived second optical flow map to compute a plurality of second motion vector values. The plurality of second motion vector values may correspond to a relative movement of each of the plurality of pixels from the second image frame to the third frame. The computation of the plurality of first motion vector values and the plurality of second motion vector values is explained, for example, in detail in FIG. 2.

The image processing apparatus 102 may be configured to identify a first foreground region across the first frame and the second frame based on the derived first optical flow map. The first foreground region may include at least one moving object in the plurality of frames. In some embodiments, a plurality of moving objects may be in the first foreground region. Hereinafter, the plurality of moving objects or the at least one moving object may be interchangeably referred to as moving objects. The identification of the first foreground region (or the moving objects) across the first frame and the second frame may be done, based on the derived first optical flow map. The identification of the first foreground region in the plurality of frames may be done further based on detection of a background region in the plurality of frames. Thus, the image processing apparatus 102 may be further configured to detect a background region in each of the plurality of frames based on a plurality of sensor-based optical flow maps for the plurality of frames.

In some embodiments, the detected background region in the plurality of frames may be extracted or subtracted from the plurality of frames to identify the first foreground region. The background region may be detected further based on gyro information and the optical flow maps derived based on displacement of pixels in different frames of the captured plurality of frames. The image processing apparatus 102 may be further configured to identify a second foreground region across the second frame and the third frame based on the derived second optical flow map. The identified second foreground region may include moving objects in the second frame and the third frame of a scene.

For example, a set of frames (I) of the scene 108 may include a first frame ($I_1$), a second frame ($I_2$) and a third frame ($I_3$) arranged in a sequential order. A displacement of a first region of "128 by 128 pixels" between the second frame ($I_2$) and the first frame ($I_1$) may be detected as a first foreground region ($F_1$) and a further displacement of a second region of "320 by 240 pixels" between the second frame ($I_2$) and the third frame ($I_3$) may be detected subsequently as a second foreground region ($F_2$).

The image processing apparatus 102 may be further configured to warp the identified first foreground region associated with the moving objects across the first frame and the second frame based on the derived first optical flow map. The warping of the identified first foreground region may be further based on a map of each pixel of a plurality of pixels in the second frame to a pixel in the first frame. The image processing apparatus 102 may be further configured to detect moving objects based on a combination of a plurality of pixels in the warped first foreground region (i.e., the warped image of the first foreground region) and a plurality of pixels in the identified second foreground region that may correspond to the moving objects in the third frame. The detection of at least one moving object may be further based on an overlap of the second foreground region for the at least one moving object over the warped first foreground region for the corresponding at least moving object. In accordance with an embodiment, the image processing apparatus 102 may be configured to utilize the detected moving objects from the plurality of frames to execute different object-based operations, for example, auto-focus on the detected moving objects or a modification of visual parameters associated with the detected moving objects.

It may be noted that the moving object detection may be further utilized to obtain further information associated with the detected objects in the captured plurality of frames. Such information may be further utilized in different applications, for example, human-computer interactions, robotics (e.g., service robots), consumer electronics (e.g., smart-phones), security (e.g., recognition, tracking), retrieval (e.g., search engines, photo management), and transportation (e.g., autonomous and assisted driving), without a deviation from scope of the disclosure.

The image processing apparatus 102 may detect different moving objects (that may occlude or deform) for different applications that may further pose different requirements. The detection may be done within an optimal processing time, a robustness to occlusion, an invariance to rotation, a robust detection under pose change, and the like. In some cases, the detection of different objects may be further utilized to detect at least one of multiple types of objects that span different object classes (such as, humans, animals, vehicles, and the like) and a single type of object from different views (e.g., side and frontal view of vehicles).

It may be further noted that the plurality of objects (for example, the plurality of objects 110) may be detected and tracked invariant of a scale, a position, an occlusion, an illumination, and an orientation of different objects with respect to a state of the image-capture device 102A. The detailed operation of the image processing apparatus 102 may be further described in detail, for example, in FIG. 2 and FIG. 3.

It may be further noted that the image processing apparatus 102 may be locally present around the image processing apparatus 102 or may be integrated with the image processing apparatus 102. However, the disclosure may not be so limited and the image processing apparatus 102 may be implemented remotely at a cloud media server, such as the server 104, without a deviation from the scope of disclosure.

Figure 2:
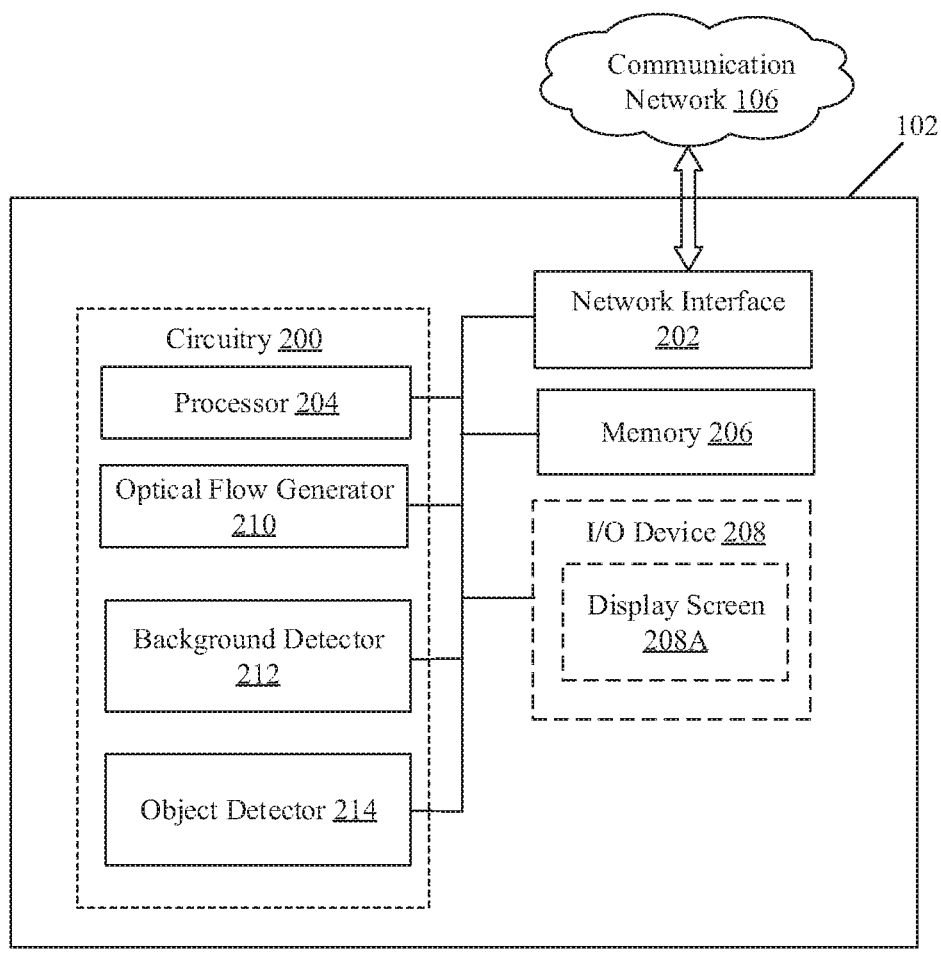
FIG. 2 is a block diagram that illustrates an exemplary image processing apparatus for detection of moving objects in a sequence of frames, in accordance with an embodiment of the disclosure.

FIG. 2 is a block diagram that illustrates an exemplary image processing apparatus for detection of moving objects in a sequence of frames, in accordance with an embodiment of the disclosure. FIG. 2 is explained in conjunction with elements from FIG. 1. With reference to FIG. 2, there is shown a block diagram of the image processing apparatus 102. The image processing apparatus 102 may include a circuitry 200, a network interface 202, a memory 206, and an Input/output (I/O) device 208. The circuitry 200 may further include a processor 204, an optical flow generator 210, a background detector 212, and an object detector 214. Similarly, the I/O device 208 may include the image-capture device 102A and a display screen 208A. In some cases, the image-capture device 102A may be communicatively coupled to the image processing apparatus 102, via the communication network 106. The circuitry 200 may be communicatively coupled with the network interface 202, the memory 206, the I/O device 208, via a set of communication ports/channels.

The network interface 202 may comprise suitable logic, circuitry, and interfaces that may be configured to establish communication between the image processing apparatus 102 and the server 104, via the communication network 106. The network interface 202 may be implemented by use of various known technologies to support wired or wireless communication of the image processing apparatus 102 with the communication network 106. The network interface 202 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer.

The network interface 202 may communicate via wireless communication with networks, such as the Internet, an Intranet and a wireless network, such as a cellular telephone network, a wireless local area network (LAN) and a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and IEEE 802.11n), voice over Internet Protocol (VoIP), light fidelity (Li-Fi), Wi-MAX, a protocol for email, instant messaging, and Short Message Service (SMS).

The processor 204 may comprise suitable logic, circuitry, and interfaces that may be configured to execute a set of instructions stored in the memory 206. The processor 204 may be implemented based on a number of processor technologies known in the art. Examples of the processor 204 may include, but are not limited to, a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The memory 206 may comprise suitable logic, circuitry, and interfaces that may be configured to store a set of instructions executable by the processor. The memory 206 may be configured to store data associated with operating systems and associated applications. The memory 206 may be further store instructions and control signal data that may be utilized to detect different objects engaged in motion in successive frames of the captured plurality of frames. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The I/O device 208 may comprise suitable logic, circuitry, and interfaces that may be configured to provide an I/O channel/interface between a user and the different operational components of the image processing apparatus 102. The I/O device 208 may receive an input from a user and present an output based on the provided input from the user. The I/O device 208 may include various input and output ports to connect various other I/O devices that may communicate with different operational components of the image processing apparatus 102. Examples of the input device may include, but are not limited to, a touch screen, a keyboard, a mouse, a joystick, a microphone, and other image-capture devices. Examples of the output device may include, but are not limited to, a display (for example, the display screen 208A), a speaker, and a haptic or other sensory output device.

The display screen 208A may comprise suitable logic, circuitry, interfaces that may be configured to display the captured plurality of frames and the detected moving objects in captured plurality of frames. The display screen 208A may be realized through several known technologies such as, but not limited to, at least one of a Liquid Crystal Display (LCD) display, a Light Emitting Diode (LED) display, a plasma display, and an Organic LED (OLED) display technology, and other display. In accordance with an embodiment, the display screen 208A may refer to a display screen of smart-glass device, a see-through display, a projection-based display, an electro-chromic display, and a transparent display. The see-through display may be a transparent or a semi-transparent display. In accordance with an embodiment, the see-through display or the projection-based display may generate an optical illusion that the segmented object is floating in air at a pre-determined distance from a user's eye and, thereby provide an enhanced user experience.

The optical flow generator 210 may comprise suitable logic, circuitry, and interfaces that may be configured to derive a first optical flow map based on motion information of a first frame and a second frame in a captured plurality of frames. The optical flow generator 210 may be further configured to derive a second optical flow map based on motion information of a third frame and a second frame in a plurality of frames. Also, the optical flow generator 210 may be further configured to derive a plurality of sensor-based optical flow maps from the plurality of frames. In some embodiments, the optical flow generator 210 may be implemented as a single hardware processor, a cluster of processor, or a specialized hardware circuitry (as shown) in the image processing apparatus 102. For example, the optical flow generator 210 may be implemented based on one of an x86-based processor, a RISC processor, a field programmable gate array (FPGA), an ASIC processor, a programmable logic ASIC (PL-ASIC), a CISC processor, and other hardware processors. In other embodiments, the optical flow generator 210 may be implemented as programs/instructions executable at the processor that may execute the functions of the optical flow generator 210 in a sequential or parallelized executional paradigm.

The background detector 212 may comprise suitable logic, circuitry, and interfaces that may be configured to identify a background region in different frames of the captured plurality of frames. Such background region may be a static background region or may encounter some modification in successive frames. In some embodiments, the background detector 212 may be implemented as a single hardware processor, a cluster of processor, or a specialized hardware circuitry (as shown) in the image processing apparatus 102. For example, the background detector 212 may be implemented based on one of an x86-based processor, a RISC processor, a field programmable gate array (FPGA), an ASIC processor, a programmable logic ASIC (PL-ASIC), a CISC processor, and other hardware processors. In other embodiments, the background detector 212 may be implemented as programs/instructions executable at the processor 204 that may execute the functions of the background detector 212 in a sequential or parallelized executional paradigm.

The object detector 214 may comprise suitable logic, circuitry, and interfaces that may be configured to detect the moving objects based on combination of a plurality of pixels in a warped first foreground region (from first and second frame) and a plurality of pixels in a second foreground region for the moving objects (from second and third frame). In some embodiments, the object detector 214 may be implemented as a single hardware processor, a cluster of processor, or a specialized hardware circuitry (as shown) in the image processing apparatus 102. For example, the object detector 214 may be implemented based on one of an x86-based processor, a RISC processor, a field programmable gate array (FPGA), an ASIC processor, a programmable logic ASIC (PL-ASIC), a CISC processor, and other hardware processors. In other embodiments, the object detector 214 may be implemented as programs/instructions executable at the processor 204 that may execute the functions of the object detector 214 in a sequential or parallelized executional paradigm.

In operation, the image-capture device 102A, may capture a plurality of frames in a sequence, of a scene (for example, scene 108) in FOV of the image-capture device 102A. The plurality of frames may be captured based on an input provided by a user, via a selection of a graphical button rendered at the display screen 208A, gesture-based inputs, voice-based inputs, or a button-press event directly from the image processing apparatus 102. Alternatively, the image processing apparatus 102 may retrieve the plurality of frames as pre-stored image data from the server 104. The plurality of frames may be a part of a video, and or selectively captured frames at closely spaced intervals, for example, from 30 milliseconds to 500 second. Such plurality of frames may include at least a first frame, a second frame, and a third frame in a sequence.

The processor 204 may be configured to derive, using the optical flow generator 210, a first optical flow map based on motion information in the first frame and the second frame of the captured plurality of frames. The first optical flow map may be generated based on a difference in values of pixel locations of the plurality of pixels in the second frame and the first frame. Accordingly, the processor 204 may be configured to, derive, using the optical flow generator 210, a second optical flow map based on motion information of the second frame and the third frame of the plurality of frames captured by the image-capture device 102A. The second optical flow map may be generated based on a difference of pixel location of the plurality of pixels in the second frame and the third frame.

The processor 204 may be configured to implement, using the background detector 212, various techniques to compute a plurality of first motion vector values for a plurality of pixels in the second frame with respect to the first frame. The plurality of first motion vector values may be computed based on the first optical flow map generated by the optical flow generator 210. The processor 204 may be configured to implement, using the background detector 212, various techniques to compute a plurality of sensor-based motion vector values for the plurality of pixels in the second frame based on an input (such as the angular velocity information) received from a motion sensor in the image-capture device 102A or the image processing apparatus 102 (not shown). The processor 204 may be configured to generate, using the background detector 212, a background model for the plurality of the frames based on the first optical flow map and the plurality of sensor-based optical flow maps generated by the processor 204, in conjunction with the optical flow generator 210. Such background model may be utilized to identify the background region in each frame based on the computed plurality of first motion vector values and the computed plurality of sensor based motion vector values.

The plurality of first motion vector values may correspond to a relative movement of a plurality of pixels from the first frame to the second frame. Such computation of the relative movement of the plurality of pixels from one frame to a subsequent frame may be done based on various techniques that may be known to one skilled in the art. Examples of such techniques may include, but are not limited to, a sum of absolute difference (SAD) technique, a sum of squared difference (SSD) technique, a weighted sum of absolute difference (WSAD) technique, and a weighted sum of squared difference (WSSD) technique. Other techniques known in the art may also be implemented to compute the relative movement of the plurality of pixels, without a deviation from the scope of the disclosure.

In accordance with an embodiment, the processor 204 may be further configured to compute using the background detector 212, a histogram distribution for a plurality of pixels (a specific region) in each frame from the plurality of frames. The histogram distribution may be generated to further analyze the plurality of pixels in each frame based on a threshold that may be set for the histogram distribution. The processor 204 may be further configured to assign, using the background detector 212, a probability value to each pixel that may be mapped to a sample in the histogram distribution based on whether the pixel belongs to the foreground region or the background region, in accordance with a specific probability distribution. For example, a probability value may be assigned based on a comparison of a pixel value with the set threshold value. Further, the processor 204 may be configured to utilize the histogram distribution to classify, using the background detector 212, specific regions (of pixels) in each frame as background pixels or foreground pixels. Thus, the plurality of pixels may be further classified as the background region or the foreground region. Thereafter, the processor 204 may be further configured to segregate, using the background detector 212, the detected background region and different foreground regions in the plurality of frames.

The processor 204 may be further configured to identify using the object detector 214, a first foreground region that corresponds to the moving objects across the first frame and the second frame based on the detected background region. The identification of the first foreground region may be done after the detected background region may be removed from first frame and the second frame. The first foreground regions may be prominently identified when a difference between the second frame and the first frame may specifically exhibit intensity values for pixel locations that may change in the first frame and the second frame. The aforementioned technique for detection of the first foreground region may exhibit efficiency in cases where all foreground pixels may move and all background pixels may remain fixed or static.

The processor 204 may be further configured to apply using the background detector 212, a threshold intensity value for a difference image obtained based on a difference between the second frame and the first frame to improve the subtraction of the background region from the first frame and the second frame. Pixels intensities that may correspond to a relative movement of the plurality of pixels from the first frame to the second frame may be filtered on the basis of value of the threshold and foreground detection with faster movements may require higher thresholds and slower movements may require lower thresholds.

The processor 204 may be further configured to warp, using the object detector 214, the identified first foreground region associated with the moving objects across the second frame based on the derived first optical flow map The warping may be done to precisely determine a position of the first foreground region. In some cases, the optical flow map-based identification of the first foreground region may include noises and imprecise results (for example, excess region marked as the detected foreground region). Therefore, to compensate for the noise in the identification of the first foreground region, a plurality of pixels displaced in successive frames may be mapped based on the warping. In accordance with an embodiment, the processor 204 may be configured to execute, using the object detector 214, warping of the first foreground region that may define a plurality of first points on the first frame and a plurality of second points (as pixel positions) in the second frame. A mathematical model may be utilized to execute a geometrical mapping that may relate the plurality of first points in the first frame precisely to the plurality of second points in the second frame of the plurality of frames. Additionally, the geometrical mapping may be further utilized to verify whether all pixel positions in the second frame map back to pixel positions in the first canonical frame. The first foreground region may be warped by applying first optical flow to the first foreground region identified based on the first optical flow map.

The processor 204 may be configured to identify, using the object detector 214, the second foreground region corresponding to the at least one moving object across the second frame and the third frame based on the derived second optical flow map. The second optical flow map may be generated based on a difference of pixel location of the plurality of pixels in the second frame and the third frame. The plurality of second motion vector values may correspond to a relative movement of each of the plurality of pixels from the second image frame to the third frame.

In accordance with an embodiment, the object detector 204 may be further configured to determine a final foreground region based on combination of a plurality of pixels in the warped first foreground region and a corresponding plurality of pixels in the second foreground region. The determined final foreground region may correspond to the at least one moving object. The object detector 214 may be further configured to detect the moving object/foreground region based on combination of the plurality of pixels in the warped first foreground region and the corresponding plurality of pixels in the second foreground region. The object detector 214 may be further configured to detect the moving object in the determined final foreground region corresponding to the at least one moving object in the third frame. An overlapping part on combination of a plurality of pixels in the warped first foreground region (i.e., warped image of the verified first foreground region) and a corresponding plurality of pixels in a second foreground region may lead to detection of the actual object.

The processor 204 may be further configured to apply, using the object detector 214, morphological filtration to the final foreground region detected in the plurality of frames. Dilation and erosion may be applied to the determined final foreground region to determine an accurate contour of the foreground region that may facilitate detection of the moving objects, advantageously in a computationally efficient manner. Morphological filtering may further remove unwanted pixels from the background region and improve a quality of the detected moving object. In an exemplary scenario, the morphological filtering may facilitate removal of isolated pixels (erosion) that may correspond to the foreground region and merge (dilation) nearby disconnected pixels that may correspond to the foreground region. After the application of morphological filtration, an accurate contour of the second foreground region may be obtained.

The processor 204 may be further configured to label, using the object detector 214, a foreground region that may correspond to the detected moving objects in the plurality of frames. The detected moving objects may be labelled with different unique identifiers, such as alphanumeric numbers, color codes, and tags. The background region and the final foreground region detected based on the first optical flow map and the second optical flow map may be represented as a binary image. The processor 204 may be configured to apply, using the object detector 214, a label to each group of connected pixels of the detected final foreground region in the binary image.

The operations performed by the image processing apparatus 102, as described in FIG. 1, may be performed by the processor 204 in conjunction with the optical flow generator 210, the background detector 212, and the object detector 214. Other operations performed by the processor 204 in conjunction with the optical flow generator 210, the background detector 212, and the object detector 214 are further described, for example, in the FIG. 3.

Figure 3:
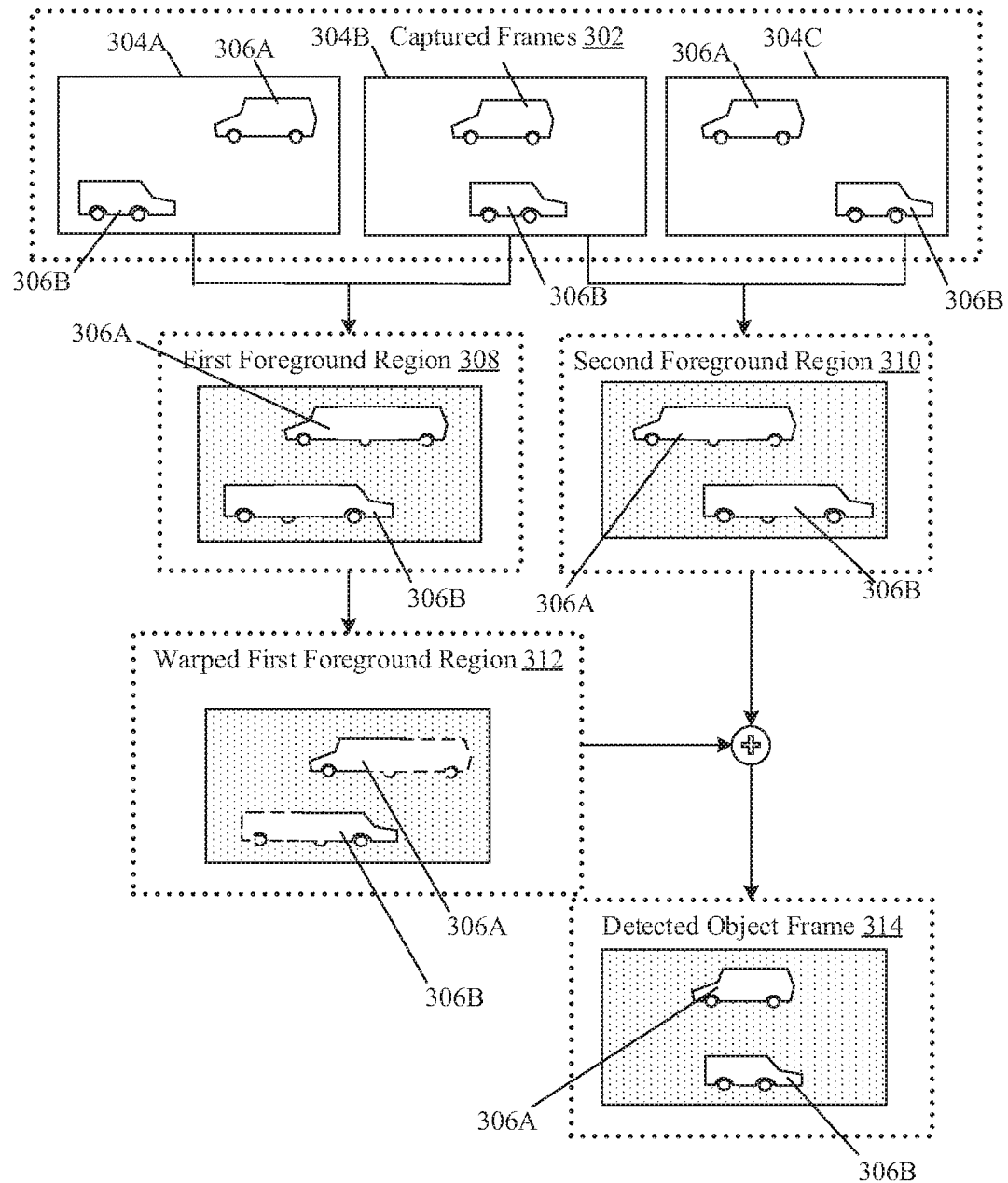
FIG. 3 illustrates an exemplary scenario and operations for detection of moving objects in a sequence of frames by the image processing apparatus of FIG. 2, in accordance with an embodiment of the disclosure.

FIG. 3 illustrates an exemplary scenario and operations for detection of moving objects in a sequence of frames by the image processing apparatus 102 of FIG. 2, in accordance with an embodiment of the disclosure. FIG. 3 is explained in conjunction with elements from FIG. 1 and FIG. 2. With reference to FIG. 3, there is shown a plurality of different stages of operations that may be executed at the image processing apparatus 102, in conjunction with the image-capture device 102A. The plurality of different stages may include a first stage, in which captured frames 302 may be retrieved and stored in the memory 206 of the image processing apparatus 102. The captured frames 302 may include a first frame 304A, a second frame 304B, and a third frame 304C of a scene captured at different time intervals or a video captured by the image-capture device 102A, while the background remains still.

The first frame 304A may include an object 306A and an object 306B that may be undetected at the first stage and the second frame 304B may include the object 306A and the object 306B at positions different from respective positions in the first frame 304A. Similarly, the third frame 304C may include the object 306A and the object 306B at positions that may be different from the respective positions in the first frame 304A and the second frame 304B. The processor 204 may be configured to derive using the optical flow generator 210, a first optical flow map based on motion information of the first frame 304A and the second frame 304B of the captured frames 302. The plurality of first motion vector values may correspond to a relative movement of each of the plurality of pixels from the first frame 304A to the second frame 304B in the captured frames 302. Accordingly, the first optical flow map may be generated based on computation of an apparent distance and direction of displacement of pixels in the second frame 304B with respect to the first frame 304A of the captured frames 302.

The processor 204 may be further configured to derive, using the optical flow generator 210, a sensor-based optical flow map based on the second frame 304B and subsequently the third frame 304C from the captured frames 302. The background region may be detected based on angular velocity information by a motion sensor, of a plurality of pixels in each frame of the captured frames 302. Examples of implementation of the motion sensor may include, but are not limited to, a gyro sensor, and an accelerometer. The background region may be further identified in the each frame based on the computed plurality of first motion vector values and the computed plurality of sensor-based motion vector values.

Alternatively, a histogram may be utilized to classify the plurality of pixels in each frame as background pixels or foreground pixels. A probability distribution may be constructed in the form of a histogram for the plurality of pixels in each frame of the captured frames 302. The histogram may be generated to analyze the plurality of pixels in each frame and determine a probability of whether a pixel mapped in the histogram may be part of either a foreground region or a background region from a comparison of pixel values to the threshold value.

At the second stage, the processor 204 may be further configured to identify a first foreground region 308 that may include a region covered by the object 306A and the object 306B. The first foreground region 308 may be identified based on the generated first optical flow map using the first frame 304A and the second frame 304B. The processor 204 may be further configured to identify, using the object detector 214, a second foreground region 310 that may include the object 306A and the object 306B at two different positions in the third frame 304C with respect to the second frame 304B. The second foreground region 310 may be identified based on the derived second optical flow map. The second optical flow map may be generated based on a difference of location of a plurality of pixels in the second frame 304B and the third frame 304C of the captured frames 302. The first foreground region 308 in the generated first optical flow map may be larger than the actual moving object, such as the object 306A and the object 306B, based on the method used for generation of the first optical flow map. Therefore, the first optical flow map and the second optical flow map are utilized to identify the moving object, such as the object 306A and 306B, accurately.

The processor 204 may be further configured to warp the first foreground region 308 associated with the object 306A and the object 306B across the first frame 304A and the second frame 304B, based on the first optical flow map. The processor 204 may be further configured to combine a warped first foreground region 312 with the second foreground region 310 to determine the final foreground region associated with the moving object, such as the object 106A and the object 106B. The processor 204 may be configured to combine the warped first foreground region 312 with the second foreground region 310, based on an overlap region that corresponds to common pixels of the warped first foreground region 312 and the second foreground region 310. The processor 204 may be further configured to detect an object frame 314, based on the determined final foreground region. The processor 204 may be configured to detect the object 306A and the object 306B, based on the detected object frame 314. The detected object frame 314 may include the moving objects, such as the objects 306A and the object 306B. The detected object frame 314 may indicate the actual position of the moving objects, such as the object 306A and the object 306B.

Figure 4:
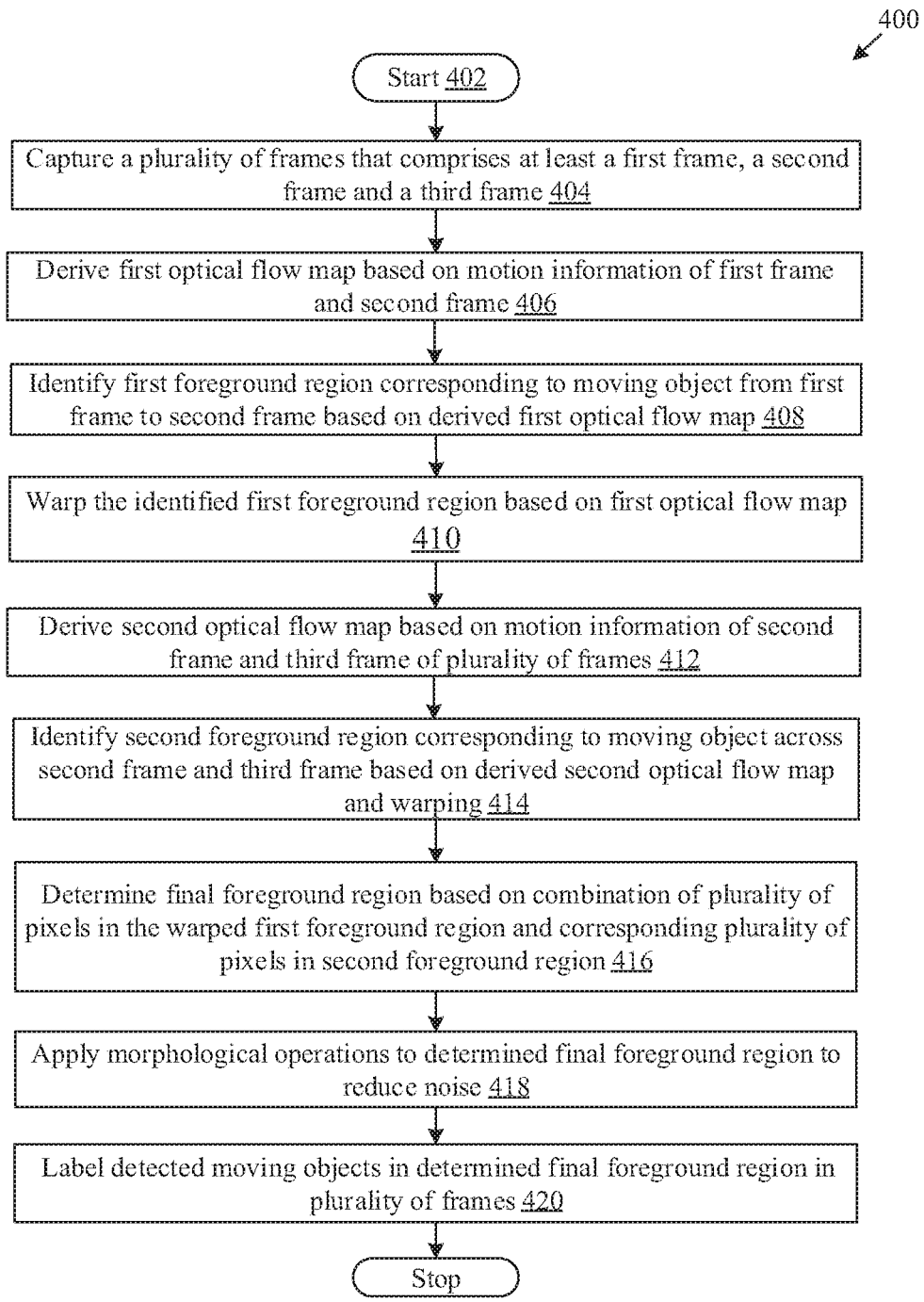
FIG. 4 depicts a flow chart that illustrates an exemplary method for moving object detection in a sequence of frames, in accordance with an embodiment of the disclosure.

FIG. 4 depicts a flow chart that illustrates an exemplary method for moving object detection in a sequence of frames, in accordance with an embodiment of the disclosure. The flow chart 400 is described in conjunction with elements from FIGS. 1, 2, and 3. With reference to FIG. 4, there is shown a flow chart 400. The method in the flow chart 400 starts at 402 and proceeds to 404.

At 404, a plurality of frames that may include a first frame, a second frame, and a third frame may be captured. The image-capture device 102A may be configured to capture the plurality of frames that may include a first frame, a second frame, and a third frame, sequentially.

At 406, a first optical flow map may be derived based on motion information of a first frame and a second frame. The processor 204 may be configured to utilize the optical flow generator 210 to derive the first optical flow map based on motion information of a first frame and a second frame. A plurality of first motion vector values that may be computed based on the first optical flow map. The plurality of first motion vector values may correspond to a relative movement of each of the plurality of pixels from the first frame to the second frame.

At 408, a first foreground region may be identified that may correspond to at least one moving object across the first frame and the second frame based on the derived first optical flow map. The processor 204 may be configured to utilize the background detector 212 to identify a first foreground region that may correspond to at least one moving object across the first frame and the second frame based on the derived first optical flow map. The identified first foreground region may be segregated from the background region in the first frame and the second frame. The identification of the background region in the current image frame may be based on the computed plurality of first motion vector values and the computed plurality of sensor-based motion vector values.

At 410, the identified first foreground region may be warped based on the first optical flow map. The processor 204 may be configured to utilize the object detector 214 to warp the identified first foreground region associated with the moving object across the first and the second frame, based on the derived first optical flow map.

At 412, a second optical flow map may be derived based on motion information of the second frame and the third frame of the captured plurality of frames. The processor 204 may be configured to utilize the optical flow generator 210 to derive a second optical flow map, based on motion information of a second frame and a third frame of a plurality of frames. The second optical flow map may be derived based on a difference of pixel location of the plurality of pixels in the second frame and the third frame. The plurality of second motion vector values may correspond to a relative movement of each of the plurality of pixels from the second image frame to the third frame.

At 414, the second foreground region that may correspond to the at least one moving object across the second frame and the third frame may be identified based on the derived second optical flow map. The processor 204 may be configured to utilize the object detector 214 to identify the second foreground region that corresponds to the at least one moving object across the second frame and the third frame based on the derived second optical flow map.

At 416, a final foreground region may be determined based on a combination of a plurality of pixels in the warped first foreground region and the corresponding plurality of pixels in the second foreground region. The final foreground region may be associated with at least the moving object in the first frame, the second frame, and the third frame. The processor 204 may be configured to utilize the object detector 214 to detect the moving object based on a combination of a plurality of pixels in the warped first foreground region and the corresponding plurality of pixels in the second foreground region.

At 418, morphological operations may be applied to the determined final foreground region to reduce noise. The determined final foreground region corresponds to the detected moving object, such as the object 306A and the object 306B in the plurality of frames. The processor 204 may be configured to utilize the object detector 214 to apply morphological filtration to the final foreground region based on the combination of the plurality of pixels in the warped first foreground region and the corresponding plurality of pixels in the second foreground region in the plurality of frames. The object detector 214 may be further configured to detect the moving objects, such as the object 306A and the object 306B based on the final foreground region.

At 420, the detected moving objects may be labelled in the determined final foreground region in the plurality of frames. The processor 204 may be configured to utilize the object detector 214 to label the detected moving objects, such as the object 306A and the object 306B in the plurality of frames. The detection and labeling of the object 306A and the object 306B has been shown and described, for example, in FIG. 3. Control passes to end.

The present disclosure may provide several advantages over conventional object detection technologies. It may be noted that the more than three frames may be captured at a time. However, the image processing apparatus may advantageously detect moving objects in maximum of three successive frames from a set of captured frames. Such detection of the moving objects in a maximum of three frames may facilitate an optimal memory resource utilization and bandwidth usage, and thereby render more computational resources for other operations on the image processing device, with an insignificant impact on battery power. Such image processing apparatus may be further utilized for low power applications (for example, as a smart band) that may continuously detect moving objects from a set of three frames. The implementation of pixel-level warping techniques may further facilitate precise determination of contours or regions occupied by different moving objects in successive frames. Additionally, the warping process and further combination of successively identified foreground regions in subsequent frames may be utilized to precisely detect objects engaged in motion.

The disclosed image processing apparatus may be implemented in various application areas, such as video surveillance or tracking for moving objects, auto-focus in camera applications while an input video is captured. The disclosed image processing apparatus and method may be suited for a real-world tracking application, such as video surveillance of car tracking for autonomous navigation, a gaming system, or other real time or near-real time object detection and segmentation for such moving objects.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An apparatus for detecting moving objects in successive frames, the apparatus comprising:

a memory;
an image-capture device; and
circuitry communicatively coupled to the memory and the image-capture device,
wherein the circuitry is configured to:
derive a first optical flow map based on motion information of a first frame and a second frame of a plurality of frames captured by the image-capture device;
derive a second optical flow map based on motion information of the second frame and a third frame of the plurality of frames;
identify a first foreground region corresponding to at least one moving object across the first frame and the second frame based on the derived first optical flow map;
warp the identified first foreground region associated with the at least one moving object across the first frame and the second frame based on the derived first optical flow map;
identify a second foreground region corresponding to the at least one moving object across the second frame and the third frame based on the derived second optical flow map; and
detect the at least one moving object based on combination of a plurality of pixels in the warped first foreground region and a corresponding plurality of pixels in the second foreground region.

2. The apparatus according to claim 1, wherein the image-capture device is further configured to:
capture the plurality of frames in a field-of-view of the image-capture device; and
transfer the captured plurality of frames that comprises the first frame, the second frame and the third frame to the circuitry.

3. The apparatus according to claim 1, wherein the circuitry is further configured to detect a background region in each of the plurality of frames based on a plurality of optical flow maps for the plurality of frames and gyro-based information.

4. The apparatus according to claim 1, wherein the first optical flow map comprises a plurality of first motion vector values that corresponds to a motion of the plurality of pixels from the first frame to the second frame.

5. The apparatus according to claim 1, wherein the derivation of the first optical flow map is further based on a difference of a pixel position of the plurality of pixels in the second frame and the first frame.

6. The apparatus according to claim 1, wherein the second optical flow map comprises a plurality of second motion vector values that corresponds to a motion of the plurality of pixels from the second frame to the third frame.

7. The apparatus according to claim 1, wherein the derivation of the second optical flow map is further based on a difference of a pixel position of the plurality of pixels in the third frame and the second frame.

8. The apparatus according to claim 1, wherein the identification of a first foreground region corresponds to at least one moving object across the first frame and the second frame based on the derived first optical flow map.

9. The apparatus according to claim 1, wherein the identification of a first foreground region corresponds to at least one moving object across the first frame and the second frame based on the derived first optical flow map.

10. The apparatus according to claim 1, wherein the identification of the first foreground region in the plurality of frames is further based on detection of a background region.

11. The apparatus according to claim 1, wherein the circuitry is further configured to determine a final foreground region based on a combination of the plurality of pixels in the warped first foreground region and the corresponding plurality of pixels in the second foreground region.

12. The apparatus according to claim 11, wherein the circuitry is further configured to apply morphological operations to the final foreground region that corresponds to the detected at least one moving object in the plurality of frames.

13. The apparatus according to claim 12, wherein the morphological operations comprise morphological dilation and morphological erosion.

14. The apparatus according to claim 1, wherein the circuitry is further configured to label a foreground region corresponding to the detected at least one moving object in the plurality of frames.

15. The apparatus according to claim 1, wherein the detection of at least one moving object is further based on an overlapping of the second foreground region for the at least one moving object over the warped first foreground region for the corresponding at least one moving object.

16. A method, comprising:
in an apparatus comprising a memory, an image-capture device and circuitry communicatively coupled to the memory and the image-capture device:
deriving, by the circuitry, a first optical flow map based on motion information of a first frame and a second frame of a plurality of frames captured by the image-capture device;
deriving, by the circuitry, a second optical flow map based on motion information of the second frame and a third frame of the plurality of frames;
identifying, by the circuitry, a first foreground region corresponding to at least one moving object across the first frame and the second frame based on the derived first optical flow map;
warping, by the circuitry, the identified first foreground region associated with the at least one moving object across the first frame and the second frame based on the derived first optical flow map;
identifying, by the circuitry, a second foreground region corresponding to the at least one moving object across the second frame and the third frame based on the derived second optical flow map; and
detecting, by the circuitry, the at least one moving object based on combination of a plurality of pixels in the result of the warped first foreground region and a corresponding plurality of pixels in the second foreground region corresponding to the at least one moving object in the third frame.

17. A non-transitory computer-readable medium having stored thereon, computer-executable instructions, which when executed an image processing apparatus, causes the image processing apparatus to perform operations, the operation comprising:
deriving a first optical flow map based on motion information of a first frame and a second frame of a plurality of frames captured by an image-capture device;
deriving a second optical flow map based on motion information of the second frame and a third frame of the plurality of frames;
identifying a first foreground region corresponding to at least one moving object across the first frame and the second frame based on the derived first optical flow map;

warping the identified first foreground region associated with the at least one moving object across the first frame and the second frame based on the derived first optical flow map;

identifying a second foreground region corresponding to the at least one moving object across the second frame and the third frame based on the derived second optical flow map; and detecting the at least one moving object based on combination of a plurality of pixels in the warped first foreground region and a corresponding plurality of pixels in the second foreground region corresponding to the at least one moving object in the third frame.

* * * * *